June 29, 1954 — A. E. BISHOP — 2,682,311
COORDINATION OF STEERED WHEELS OF VEHICLES
Filed March 15, 1949 — 2 Sheets-Sheet 1

Inventor
ARTHUR E. BISHOP
by The Firm of Charles W. Hills
Attys.

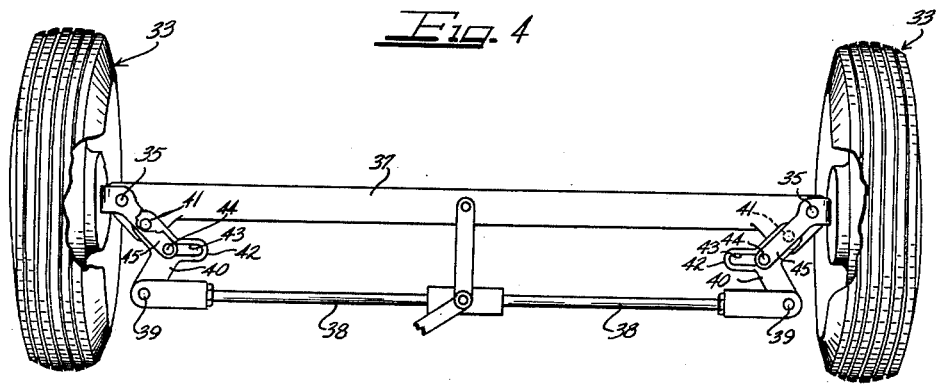
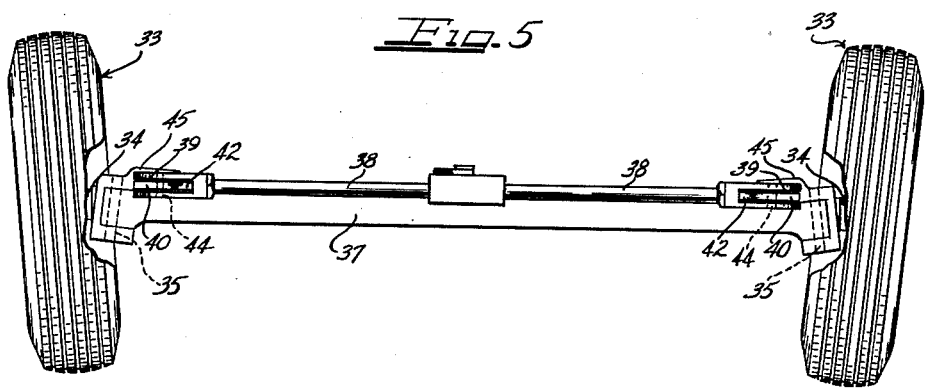
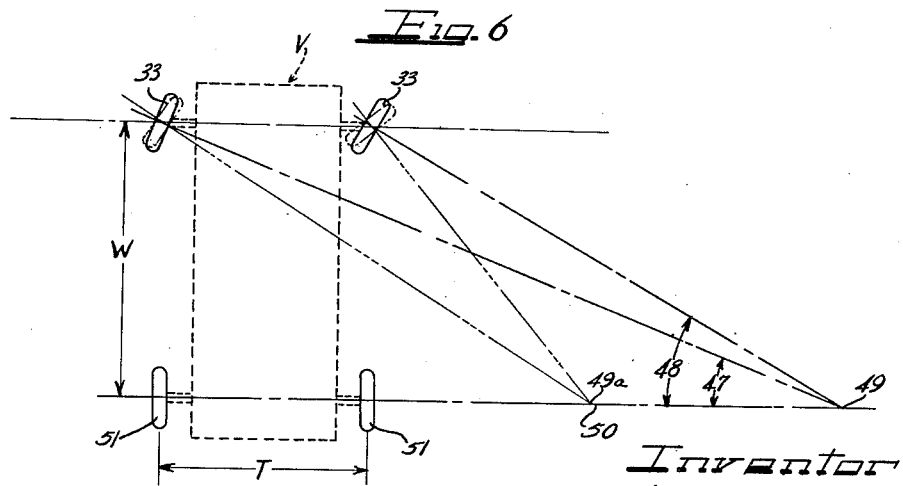

Patented June 29, 1954

2,682,311

UNITED STATES PATENT OFFICE 2,682,311

COORDINATION OF STEERED WHEELS OF VEHICLES

Arthur E. Bishop, Chatswood, near Sydney, New South Wales, Australia

Application March 15, 1949, Serial No. 81,590

6 Claims. (Cl. 180—79.2)

The present invention relates to improvements in the coordination of steered wheels of vehicles, and more particularly concerns novel means whereby the coordinated angle of turn of steered wheels is greatly increased.

In the operation of vehicles having steerable wheels including a plurality of wheels spaced apart in axial alignment, it is necessary to coordinate the turning of the wheels to prevent scrubbing of the tires and to accomplish this provisions are generally made so that, as nearly as possible, when the steered wheels turn, their axes of rotation will intersect at a line extended from the axis of rotation of the non-steered or fixed axis wheels of the vehicle. Such fixed wheels are generally disposed with their axes of rotation coaxial and at right angles to the fore and aft axis of the vehicle.

Prior expedients for coordinating steerable wheels have generally been for limited angles of turn only with a turn limit of the inside or inboard wheel at approximately 45°. Furthermore, prior arrangements have been incapable of variation to meet the widely differing characteristics of vehicles having different ratios of track to wheel base.

An important object of the present invention is to provide improved means for coordinating steered wheels of a vehicle and enabling angles of turn in excess of 45° of the inboard wheel.

A further object of the invention is to provide a steered wheel coordinating mechanism by which the steered wheels of a vehicle can be turned in proper coordination to make turns of unusually small radius.

Another object of the invention is to provide improved steered wheel coordinating mechanism which by slight changes of the geometry of the mechanism will compensate for variation of the vehicle track and wheel base proportions over a wide range.

Still another object of the invention is to provide an improved coordinating mechanism for the steered wheels of vehicles and which mechanism is of exceptionally simple and rugged components practically free from any danger of getting out of adjustment.

Yet another object of the invention is to provide a steered wheel coordinating mechanism which is readily adaptable to a variety of different types of vehicles such as airplanes, automobiles, and the like.

Other objects, features and advantages of the present invention will be readily apparent from the following detailed description of certain preferred embodiments thereof taken in conjunction with the accompanying drawings, in which:

Figure 4 is a more or less schematic plan view, partly broken away for clarity of the steerable wheels of the type adapted for use in an automobile or the like;

Figure 5 is a fragmentary more or less schematic rear elevational view of the wheel assembly of Figure 4; and Figure 6 is a schematic view illustrative of the steering coordination of the steerable wheels of Figures 4 and 5.

In one embodiment of the present invention it is especially useful in coordinating the turning of the steered wheels of aircraft installations employing two or more groups of steered wheels where it is desired to make turns of small radius, as about a wing tip.

Figure 1:
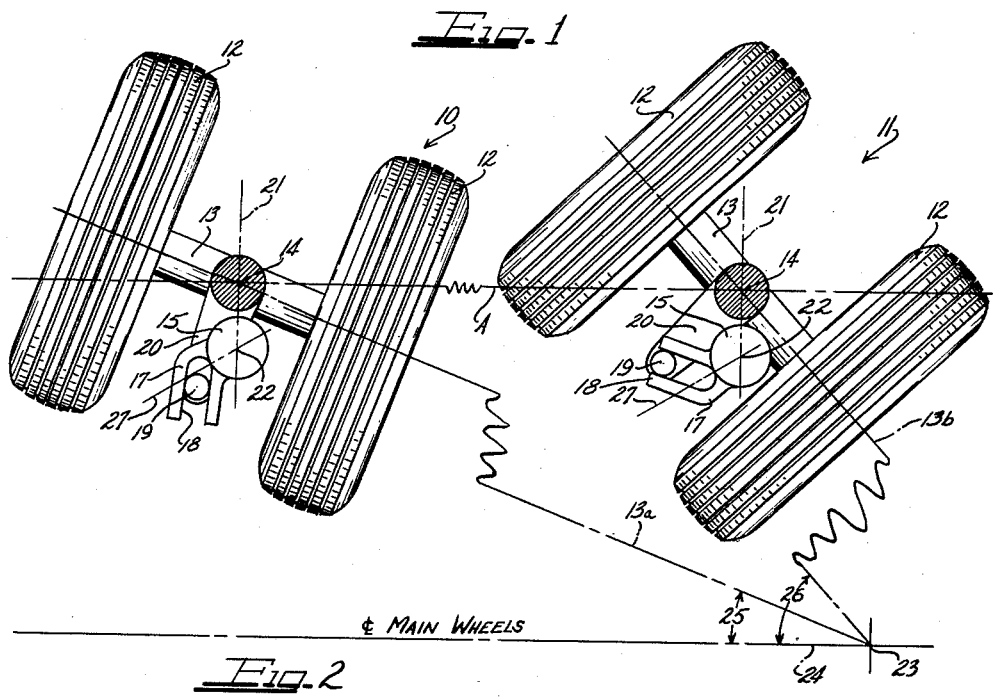
Figure 1 is a more or less schematic plan view of a pair of allochiral steering assemblies for the steered wheels for an airplane and embodying features of the present invention.

Such a wheel arrangement is shown, by way of example, in Figure 1, wherein two steered nose landing gears of an aircraft 10 and 11 are depicted in operative relationship. Each of the two landing gears comprises a pair of coaxially related spaced tired wheels 12 freely rotating on a common relatively fixed axle 13 which is arranged to swivel in a horizontal plane about an axis 14 from an in-line axis A.

As is customary with the steered wheels of aircraft, a remote controlled source of steering power is located close to the swivel axis 14 of each set of steered wheels, such steering power source being in the form of a rotary hydraulic vane motor 15, or the like. Herein the steering motors 15 are adapted to be controlled for synchronous operation from the cockpit of the aircraft to operate through equal angles at each set of steered wheels.

For coordinating the turning relationship of the wheel assemblies 10 and 11 guide and follower mechanism is provided. To this end, each of the steering motors 15 carries means comprising an operating or steering lever 17 having a parallel forked elongated guide portion with a longitudinal slot 18 therein and engaging a follower pin or roller 19 projecting from a swivel arm or lever 20 extending fixedly from the adjacent axle 13 on a radius of the swivel axis 14.

When the wheels are in-line for fore-and-aft travel, the swivel axis 14, or at least the swivel axis of the swivel lever 20, and the axis of the follower 19, in each instance, are disposed in a common line through their diameters, as indicated by the dot dash alignment line 21. This line may coincide with the median plane of the respective wheel assembly, as shown, or it may be in various practicable angular relationships to such median plane. Furthermore, the axes of rotation of the respective steering motor 15 is disposed on the same line 21 and between the swivel axis 14 and the axis of the follower 19.

In order to effect coordinated turning movement of the landing gear asemblies 10 and 11, the steering levers 17, and more particularly the steering slots 18 are disposed to extend angularly to the respective line 21 and in respective opposite polar directions for the opposite wheel assemblies so as to enhance the angle of turn of each of the landing gear assemblies for inboard turns and reduce the angle of turn for outboard turns. For example, the steering levers 17 may be disposed to extend on a radius of the axis of rotation 22 of the associated steering motor and with the axis of the slot 18 angular to such radius, such as on substantially a tangent to a circle concentric with the motor axis 22. As shown merely by way of example, the steering levers 17 of the two landing gear assemblies 10 and 11 are offset angularly to respective opposite sides of the motor axes 22 equally and oppositely directed angularly.

The extent of the steering slot 18 in each instance is determined by the extent of the inboard turning angle desired. In Figure 1, by way of example, such turning angle is shown as 50°. Hence, by reason of the particular relative arrangement of the steering levers 17 and the steering slots 18 therein, both of the landing gear wheel assemblies 10 and 11 will turn in coordinated fashion upon equal rotary movement of the steering motors 15 to direct the airplane to turn about a point 23 projected on the extended axis of the main wheels, as identified by the line 24, comprising the point of convergence of the respective axes of the wheel assemblies 10 and 11, as indicated by the outboard and inboard axis extension lines 13a and 13b, respectively. The difference in the angle of turn 25 between the main wheel axis line 24 and the outboard turning wheel axis line 13a and the angle 26 between the axis line 24 and the inboard wheel axis line 13b is determined by the angularity of the respective slots 18 of the steering levers and effect coordinated relatively small angle of turn for the outboard steered wheel assembly and increases the angle of turn for the inboard steered wheel assembly, which as shown in Figure 1 involves the wheel assemblies 10 and 11, respectively. When the wheels are turned to the opposite side, a reverse angular turning relationship occurs since then the wheel assembly 10 becomes the inboard assembly and the wheel assembly 11 becomes the outboard assembly.

The radius line 27 running through the steering motor axis 22 in each instance indicates the equal angle of turn of the steering motors 15 away from the line 21 which results in the coordinated, differential turning of the inboard and outboard wheel assemblies in operation. When the turn angle radius line 27 coincides with the fore and aft alignment line 21 running through the corresponding motor axis 22, the wheel assemblies 10 and 11 are in line for straight fore and aft movement.

Figure 2:
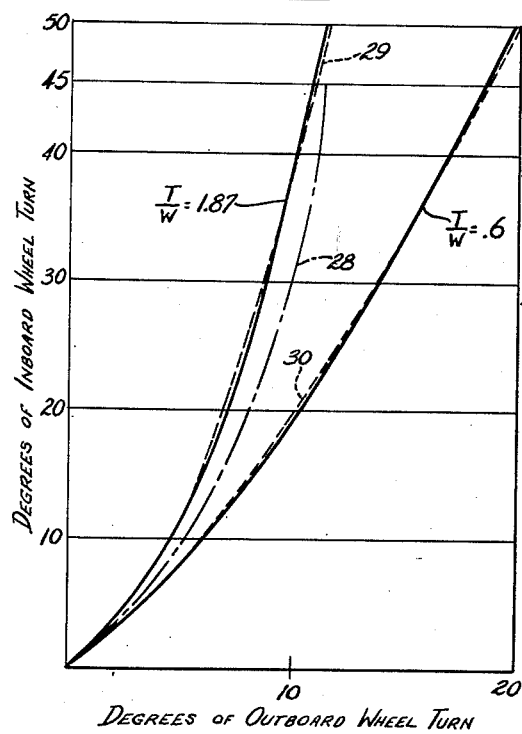
Figure 2 is a chart plotting certain operational characteristics of the mechanism of the present invention as compared with prior devices and having to do with the relationship between the angles of swivel of the outboard and inboard wheels and certain variations occurring for different ratios of wheel base to track.

Having reference to the chart or graph in Figure 2, various relationships between the angles of swivel of the outboard and inboard wheels are depicted in comparison to one another and in comparison to a conventional coordinating linkage mechanism. The relationship of inboard wheel turn to outboard wheel turn of the conventional linkage mechanism having a maximum turning or swivel limit of 45° is indicated by the curved dot dash line 28. Where the desired relationship between the inboard and outboard turn angles as expressed by ratio of wheel base (W) to track (T) is of the value $$\frac{T}{W}=1.87$$

as indicated by the solid line at the left of the graph of Figure 2, the steering coordination mechanism of the present invention substantially attains to this as indicated by the dash line 29. Should the desired relationship comprise the ratio $$\frac{T}{W}=.6$$

as indicated by the solid line at the right of the chart of Figure 2, the steering coordination mechanism of the present invention attains very close to the ideal coordinated relationship, as indicated by the dash line 30.

Figure 3:
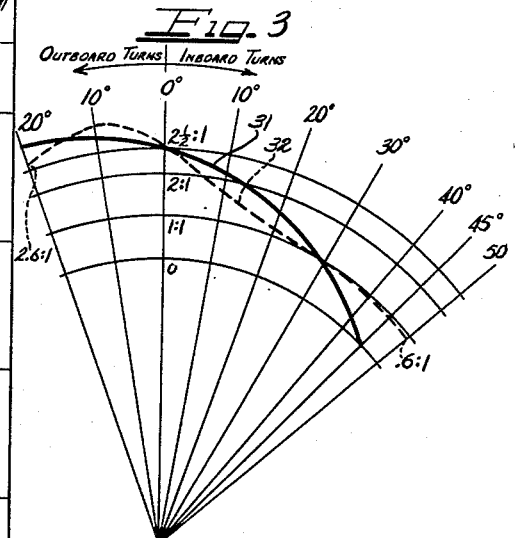
Figure 3 is a chart of the ratio of gearing for different angles of inboard and outboard turns of the wheels.

For further evidence of the advantages of the present invention reference may be had to the chart or graph shown in Figure 3 which depicts the ratio of gearing, that is, the ratio of the rate of turn of the steering motor 15 to the rate of turn of the steered wheel assembly, for differing angles of inboard and outboard turns. Starting with a ratio gearing of an in-line value of about 2½ to 1, the ratio characteristics attained by a conventional steered wheel coordinating linkage in the outboard and inboard wheel follows a ratio scheme for various angles of turn substantially as indicated by the solid curved line 31, showing that the ratio gearing of the inboard wheel becomes zero when this wheel attains 45° turn. In contrast, the turn coordinating mechanism of the present invention follows substantially the turn ratios indicated by the dash graph line 32, showing that when the inboard wheel is turned 50° the gearing ratio is substantially .6 to 1.

By reference to Figures 4, 5 and 6, adaptation is shown of the steering mechanism to a vehicle arranged for manual steering, such as in an automobile, truck or the like and including respective left and right hand steerable wheel assemblies 33, each of which is mounted rotatably on an axle 34 secured in swiveling turning relation by means of respective king pins 35 to the opposite ends of a transverse suspension member 37 upon which the chassis of the vehicle is mounted in sprung relation. Means for steering the wheels 33 comprises a common or jointed tie rod 38 which is suitably coupled to the steering hand wheel of the vehicle and which at its opposite ends is pivotally secured on pivots 39 to the ends of respective steering levers 40. The remaining ends of the respective steering levers 40 are pivotally connected on pivots 41 with the adjacent end portions of supporting or suspension member 37.

Each of the steering levers 40 has an angular, herein inwardly extending, horizontal portion 42 provided with a longitudinal slot 43 within which is operatively disposed a follower pin or roller 44 carried by a fixed swivel extension lever 45 carried by each of the respective axle structures 34. For convenience in illustration the lever mechanism has been shown on an exaggerated scale, but in practice will be small enough to be contained within an enclosure at the head of the king pin.

The construction and relationship of the levers 40 and 45 is such that substantially the same coordinated steering results are obtained in turning of the wheels as described in connection with the form of Figure 1. To this end, when the wheels 33 are in the in-line position, that is, in the position when the vehicle travels straight fore or aft, the swivel axis of the king pin 35, the lever pivot 41 and the connecting pin or roller 44 are in line on a radius of the swivel axis, in each instance. Since the slots 43 are offset in the opposite sense for each wheel, that is, extend angular in opposite polar directions to the respective radial alignments of the several axes coordinated differential turning of the outboard and inboard wheels is effected as an incident to coaction of the followers 44 in the slots 43 during a turning operation.

The desired relationship for optimum results between the angles of swivel of the outboard and inboard wheels designated at 47 and 48 in Figure 6 and for which the steering lever relationship must be organized in any given installation can be readily calculated by determining the ratio of wheel base W to track T for the particular vehicle V. As a result, convergence point 49 on axis line extension 50 of fixed axis wheels 51 of the vehicle will remain accurately on the axis extension line 50 as the steered wheels 33 are turned to any material extent from the in line position to maximum angle of turn. Representative of this coordinated relationship on increased or maximum turn coordination is the inward shifted position 49a of the convergence point 49 of the axis extension lines of the steered wheels.

I claim as my invention:

1. In combination in a steerable wheel assembly, spaced wheel assemblies arranged in generally axial alignment and each having means for turning the same in coordination with the companion wheel assembly but on respectively an independent swivel axis, a respective swivel lever extending from each swivel axis, and respective steering levers mounted to swing about respective fixed pivots spaced from said swivel axes, each of said swivel levers being movable in a sector intersecting the associated steering lever pivot axis and having the end thereof which is remote from the swivel axis projecting substantially beyond said steering lever pivot axis to the side of the latter axis remote from the swivel axis, each steering lever having an elongated slot therein, and a follower on the swinging end portion of the swivel lever slidably operative in said slot, the follower being swingable into an alignment line through the associated swivel and steering lever axes whereupon the slot cooperating therewith extends angularly to said line.

2. In combination in a steerable wheel steering mechanism, a wheel swiveling lever swingable about a fixed swivel axis, a steering lever pivoted about an axis adjacent to the swivel axis for controlling the movement of said swivel lever, said swivel lever having a follower projecting from an end portion opposite said fixed swivel axis, the steering lever having an elongated actuating slot therein within which said follower is slidably operative, said swivel and pivot axes and said follower lying in line in the fore and aft position of a wheel to be steered by the mechanism, said slot extending angularly to the line defined by said swivel and pivot axes and said follower in the fore and aft position of a wheel and said follower adapted to be actuated to swing to respectively opposite sides of said in-line position in said slot by the swinging of the steering lever for inboard and outboard swiveling of the wheel.

3. In combination in wheel steering mechanism, a wheel swiveling lever operable to swing about the swivel axis of an associated wheel, a steering lever swingable about a pivot axis for controlling the movement of said swivel lever, said steering lever having an elongated slot therein disposed in radially offset relation to said pivot axis, and a follower on said swivel lever operatively disposed in said slot and effective in the swinging movements of the steeling lever to swing the swivel lever for swiveling the wheel, said slot extending angularly to the line defined by said swivel and pivot axes and said follower in fore and aft position of the wheel.

4. In combination in steering mechanism for steerable wheels, a swivel lever, a rotary steering motor operable on an axis parallel to and adjacent to the swivel axis of the swivel lever, a steering lever projecting from the steering motor and having an elongated slot disposed therein offset with respect to an alignment line through the associated swivel axis and the axis about which said motor is operable, and a follower on the swivel lever operatively engaged within said slot.

5. In combination in a vehicle having spaced steerable wheel assemblies disposed in generally axial alignment, each wheel assembly including an axle pivotally mounted on a swivel axis enabling turning of the respective wheel assembly, a swivel lever extending fixedly from the axle and swingable about the swivel axis, a rotary steering motor for each wheel assembly mounted for operating rotation on an axis adjacent to the swivel axis, said swivel lever being of a length to swing in intersecting relation to said motor axis and projecting away from the swivel axis beyond said motor axis, each of said steering motors having a steering lever projecting therefrom and including an elongated slot disposed therein offset with respect to an alignment line through the swivel and steering motor axes with which the slot is associated, and a follower projecting from each respective swivel lever and operatively engaged within the slot of the companion steering lever, said steering lever slots being disposed in angular relation to one another in the fore and aft condition of the assemblies.

6. In combination in a vehicle having spaced steerable wheel assemblies disposed in generally axial alignment, each wheel assembly including an axle pivotally mounted on a swivel axis enabling turning of the respective wheel assembly, a swivel lever extending fixedly from the axle and swingable about the swivel axis, a rotary steering motor for each wheel assembly mounted for operating rotation on an axis adjacent to the swivel axis, said swivel lever being of a length to swing in intersecting relation to said motor axis and projecting away from the swivel axis beyond said motor axis, each of said steering motors having a steering lever projecting therefrom and including an elongated slot disposed in radially offset relation to the respective motor axis, and a follower projecting from each respective swivel lever and operatively engaged within the slot of the companion steering lever, said steering lever slots being disposed in angular relation to one another in the fore and aft condition of the assemblies and each of said steering lever slots extending angularly to the line defined by the swivel and motor axes and the follower with which the slot is associated, in the fore and aft condition of the assemblies, said steering motors being coordinated in operation to turn equally in steering of the wheel for coordinating turning movement of the respective wheel assemblies.

References Cited in the file of this patent

UNITED STATES PATENTS

| Number | Name | Date |
|---|---|---|
| 593,357 | Lanchester | Nov. 9, 1897 |
| 655,660 | Reenstierna | Aug. 7, 1900 |
| 1,082,457 | Alba | Dec. 23, 1913 |
| 1,764,730 | Kraft | June 17, 1930 |
| 2,122,924 | Ammen et al. | July 5, 1938 |
| 2,191,961 | Howell | Feb. 27, 1940 |
| 2,508,057 | Bishop | May 16, 1950 |

FOREIGN PATENTS

| Number | Country | Date |
|---|---|---|
| 299,451 | Great Britain | Mar. 28, 1929 |